(12) United States Patent
Ichihashi et al.

(10) Patent No.: US 8,917,296 B2
(45) Date of Patent: Dec. 23, 2014

(54) LUMINOUS INTENSITY DISTRIBUTION SYSTEM AND STEREOSCOPIC IMAGE DISPLAY DEVICE

(75) Inventors: Kouki Ichihashi, Osaka (JP); Takahiro Kobayashi, Okayama (JP); Yoshio Umeda, Hyogo (JP); Masahiro Kasano, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 274 days.

(21) Appl. No.: 13/478,128

(22) Filed: May 23, 2012

(65) Prior Publication Data

US 2012/0299985 A1 Nov. 29, 2012

(30) Foreign Application Priority Data

May 23, 2011 (JP) ................................ 2011-114329
Apr. 18, 2012 (JP) ................................ 2012-095054

(51) Int. Cl.
*G09G 3/34* (2006.01)
*G02B 27/22* (2006.01)

(52) U.S. Cl.
CPC .............................. *G02B 27/2214* (2013.01)
USPC ........................................ 345/691; 359/463

(58) Field of Classification Search
CPC .............. G02B 27/22; G02B 27/2214; G02B 27/2228; G02B 27/2235; G02B 27/2242; G02B 27/225; G09G 3/34–3/3696; H04N 13/04; H04N 13/0402–13/0459
USPC .................... 345/690–697, 84–107; 359/462, 359/466–477; 348/42, 51–60
See application file for complete search history.

(56) References Cited

U.S. PATENT DOCUMENTS

| | | | |
|---|---|---|---|
| 6,061,179 A * | 5/2000 | Inoguchi et al. | 359/464 |
| 7,616,172 B2 | 11/2009 | Lin et al. | |
| 2011/0134347 A1 | 6/2011 | Brott et al. | |
| 2011/0149391 A1 | 6/2011 | Brott et al. | |
| 2012/0032997 A1 * | 2/2012 | Cha et al. | 345/690 |

FOREIGN PATENT DOCUMENTS

| | | |
|---|---|---|
| JP | H09-080354 A | 3/1997 |
| JP | H10-333092 A | 12/1998 |
| JP | H11-109286 A | 4/1999 |
| WO | WO-2004-027492 | 4/2004 |
| WO | WO 2010013938 A2 * | 2/2010 |

* cited by examiner

*Primary Examiner* — Nathan Danielsen
(74) *Attorney, Agent, or Firm* — James W. Judge

(57) ABSTRACT

A luminous intensity distribution system includes a first optical element extending in a first direction, and distributes, given that a first direction is taken to be leftward-rightward when viewed frontward-rearward, light having entered a light-incident surface from a right-rear direction and emits the light through a light-emitting surface toward a right-forward direction when viewed from the frontward end, and distributes light having entered the light-incident surface from a left-rear direction and emits the light through the light-emitting surface toward a left-forward direction when viewed from the frontward end; and a second optical element extending in the first direction and that diffuses light having entered the light-incident surface and emits the light through the light-emitting side, with the first optical element and the second optical element being arranged in parallel with each other vertically when viewed frontward-rearward.

18 Claims, 13 Drawing Sheets

LUMINOUS INTENSITY DISTRIBUTION SYSTEM AND STEREOSCOPIC IMAGE DISPLAY DEVICE

BACKGROUND OF THE INVENTION

1. Field of the Invention

The present invention relates to stereoscopic image display devices, and in particular, to stereoscopic image display devices capable of displaying images stereoscopically to viewers in a plurality of different viewing positions without requiring stereoscopic image-viewing assist glasses.

2. Description of the Background Art

Generally, stereoscopic image display devices employ a method that presents images having a parallax to the left and right eyes of a viewer, respectively. As methods for presenting parallax images, it is possible to employ glasses for limiting light of images that enters the left and right eyes, respectively. However, it is also possible for a naked-eye viewing method that controls light of images that enters the left and right eyes of the viewer, without using such glasses.

In the case of the method using glasses, the viewer needs to wear glasses when viewing images. Therefore, the viewer may feel uncomfortable in wearing these glasses. On the other hand, in the case of the naked-eye viewing method which does not use glasses, it is general that stereoscopic image display devices employ a method using optical techniques such as a lenticular system or a parallax barrier system.

The lenticular system is a system in which an image is displayed by using a screen having a directivity in the horizontal direction (lenticular lens array), such that parallax images simultaneously enter the left and right eyes. The lenticular system has a problem that since a right eye image and a left eye image are displayed in alternating vertical pixel lines, the number of pixels in the vertical direction is halved.

The parallax barrier system is a system in which slits arranged between parallax display images and the eyes of the viewer serve as barriers for different parallax images such that a left parallax image and a right parallax image are generated, thereby causing the parallax images to simultaneously enter the left and right eye to display an image.
The parallax barrier system also has a problem that since a right eye image and a left eye image are displayed in alternating vertical pixel lines, the number of pixels in the vertical direction is halved. Moreover, since slits are used, the light utilization rate is also reduced.

A technique that solves the reduction of the number of pixels and the light utilization rate is proposed in International Publication WO 2004/027492, which discloses a configuration including: light sources arranged on light-incident surfaces at facing ends of a light guide plate; a prism sheet having a triangular prism row provided on a surface facing the light-emitting surface of the light guide plate, the triangular prism row extending in parallel to the light-incident surface of the light guide plate, and a cylindrical lens row provided on a surface opposite to the light-emitting surface of the light guide plate relative to the triangular prism row, the cylindrical lens extending in parallel to the triangular prism row; and a transmission-type liquid crystal panel arranged on the light-emitting surface of the prism sheet. A driving means causes light from the light sources to be emitted from the transmission-type display panel at an angle corresponding to the parallax between the left and right parallax, synchronized with the left and right parallax images to be alternately displayed on the transmission-type panel. International Publication WO 2004/027492 asserts that, according to the above configuration, a high-quality stereoscopic image can be obtained without reducing the number of pixels and the light utilization rate.

As also described in International Publication WO 2004/027492, within the lenticular lens system, an image is displayed through a lenticular lens in both cases where a two-dimensional image is displayed and where a stereoscopic image is displayed. In the parallax barrier system, in both cases where a two-dimensional image is displayed and where a stereoscopic image is displayed, such an image is displayed with a fixed parallax barrier. Alternatively, in the parallax barrier system, when a stereoscopic image is displayed, a display element such as a liquid crystal element is caused to function as a parallax barrier, and when a two-dimensional image is displayed, the image is allowed to pass through the display element without a parallax barrier. Moreover, in the configuration of the invention of International Publication WO 2004/027492, when a two-dimensional image is displayed, the left and right light sources are simultaneously lit.

SUMMARY OF THE INVENTION

An issue with conventional stereoscopic image display devices is that on account of an optical system for naked-eye viewing of stereoscopic images in a given position, the view range for images in all aspects apart from the given aspect is restricted.

For example, in International Publication WO 2004/027492, the lenticular system, and the parallax barrier system, image light coming through the optical system for a stereoscopic image is viewed in both cases where a two-dimensional image is viewed and where a stereoscopic image is viewed. Accordingly, the viewing area for a two-dimensional image is narrowed. Moreover, for example, in International Publication WO 2004/027492, the lenticular system, and the parallax barrier system, a viewer can view a stereoscopic image only in one predetermined viewing position. However, it is desired that a stereoscopic image can be viewed in a plurality of viewing positions.

Therefore, an object of the present invention is to provide a luminous intensity distribution system and a stereoscopic image display device that are each provided with an optical system that allows naked-eye viewing of a stereoscopic image in one specific position, and that can allow other aspects of viewing that are not hindered by the viewing system for the specific position.

A luminous intensity distribution system of the present invention is a luminous intensity distribution system having a light-incident surface and a light-emitting surface, and in which, given that with respect to the light-emitting surface the system end through which light is emitted is taken to be frontward, the light-incident surface is arranged rearward of the light-emitting surface when viewed from the frontward end, the luminous intensity distribution system comprising: a first optical element extending in a first direction, and distributing, given that the first direction is taken to be leftward-rightward when viewed frontward-rearward, light having entered the light-incident surface from a right-rear direction and emitting the light through the light-emitting surface toward a right-forward direction when viewed from the frontward end, and distributing light having entered the light-incident surface through a left-rear direction and emitting the light through the light-emitting surface toward a left-forward direction when viewed from the frontward end; and a second optical element extending in the first direction and diffusing light having entered the light-incident surface and emitting the light through the light-emitting surface, wherein the first optical element and the second optical element are arranged in parallel with each other vertically when viewed frontward-rearward.

A stereoscopic image display device of the present invention is a stereoscopic image display device configured to display a stereoscopic image, comprising: a right light source configured to supply display light for displaying a right eye image for a stereoscopic image; a left light source configured to supply display light for displaying a left eye image of the stereoscopic image; a luminous intensity distribution system having, given that a front side of the stereoscopic image display device is taken to be frontward, a light-incident surface and a light-emitting surface whose light-emitting side corresponds to the frontward end, the light-incident surface being arranged rearward of the light-emitting surface, the luminous intensity distribution system including: a first optical element extending leftward-rightward, and configured to distribute, when viewed from the frontward end, light that has been emitted by the right light source and that has entered the light-incident surface from a right-rear direction, from the light-emitting surface into a right-forward direction and to distribute, when viewed from the frontward end, light that has been emitted by the left light source and that has entered the light-incident surface from a left-rear direction, from the light-emitting surface into a left-forward direction, such that image light of the right eye image and image light of the left eye image construct an image in a first viewing position, and a second optical element extending leftward-rightward, and configured to diffuse light that has been emitted by the right light source and that has entered the light-incident surface and light that has been emitted by the left light source and that has entered the light-incident surface so as to be emitted from the light-emitting surface, such that image light of the right eye image and image light of the left eye image are distributed, the first optical element and the second optical element being vertically arranged with each other; and a display panel configured to control transmission of light from the luminous intensity distribution system, based on the right eye image and the left eye image of the stereoscopic image.

According to the configuration, it is possible to view a stereoscopic image in one specific position, and in addition, it is possible to view a stereoscopic image by using glasses and a two-dimensional image in a wide viewing area.

A luminous intensity distribution system of the present invention is a luminous intensity distribution system having a light-incident surface and a light-emitting surface, and in which, given that with respect to the light-emitting surface the system end through which light is emitted is taken to be frontward, the light-incident surface is arranged rearward of the light-emitting surface when viewed from the frontward end, the luminous intensity distribution system comprising: a plurality of types of optical elements with different respective construct-image positions, each of the plurality of types of optical elements extending in a first direction, and distributing, given that the first direction is taken to be leftward-rightward when viewed frontward-rearward, light having entered the light-incident surface from a right-rear direction and emitting the light through the light-emitting surface toward a right-forward direction when viewed from the frontward end, and distributing light having entered the light-incident surface from a left-rear direction and emitting the light through the light-emitting surface toward a left-forward direction when viewed from the frontward end, the plurality of types of optical elements being arranged in parallel with each other vertically when viewed frontward-rearward.

A stereoscopic image display device of the present invention is a stereoscopic image display device configured to display a stereoscopic image, comprising: a right light source configured to supply display light for displaying a right eye image for a stereoscopic image; a left light source configured to supply display light for displaying a left eye image of the stereoscopic image; a luminous intensity distribution system having, given that a front side of the stereoscopic image display device is taken to be frontward, a light-incident surface and a light-emitting surface whose light-emitting side corresponds to the frontward end, the light-incident surface being arranged rearward of the light-emitting surface, the luminous intensity distribution system including a plurality of types of optical elements with different respective construct-image positions, each of the plurality of types of optical element extending leftward-rightward and configured to distribute, when viewed from the frontward end, light that has been emitted by the right light source and that has entered the light-incident surface from a right-rear direction, from the light-emitting surface into a right-forward direction and to distribute, when viewed from the frontward end, light that has been emitted by the left light source and that has entered the light-incident surface from a left-rear direction, from the light-emitting surface into a left-forward direction, such that image light of the right eye image and image light of the left eye image construct an image in a plurality of viewing positions, the plurality of types of optical elements being vertically arranged with each other; and a display panel configured to control transmission of light from the luminous intensity distribution system, based on the right eye image and the left eye image of the stereoscopic image.

According the configuration, it is possible to view a stereoscopic image, even in a position other than one specific position, in an appropriate manner.

According to the present invention, it is possible to provide a luminous intensity distribution system and a stereoscopic image display device that can expand viewing aspects which are not hindered by a naked-eye viewing system for viewing a stereoscopic image in one specific position.

Figure 6:
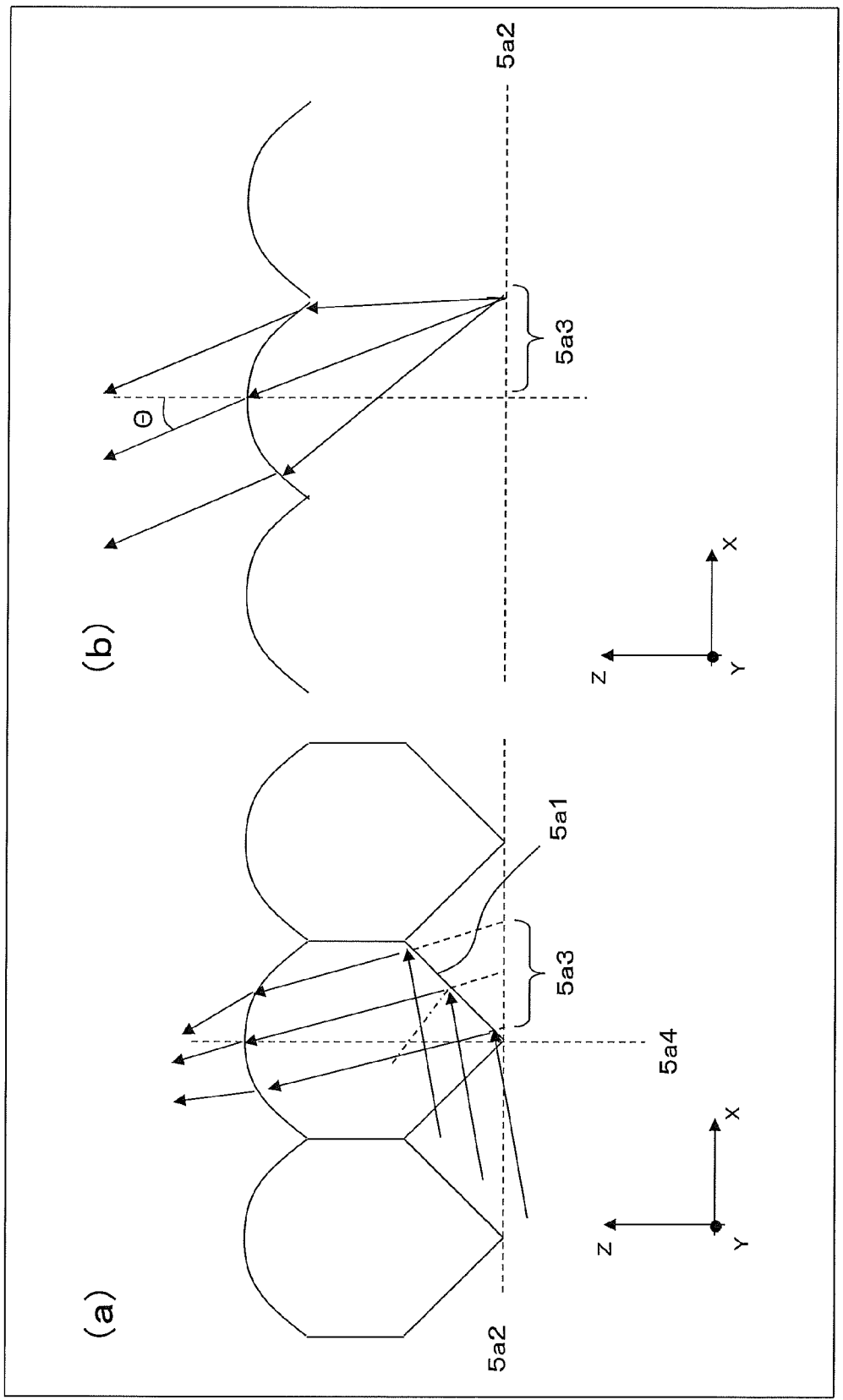
Figure 7:
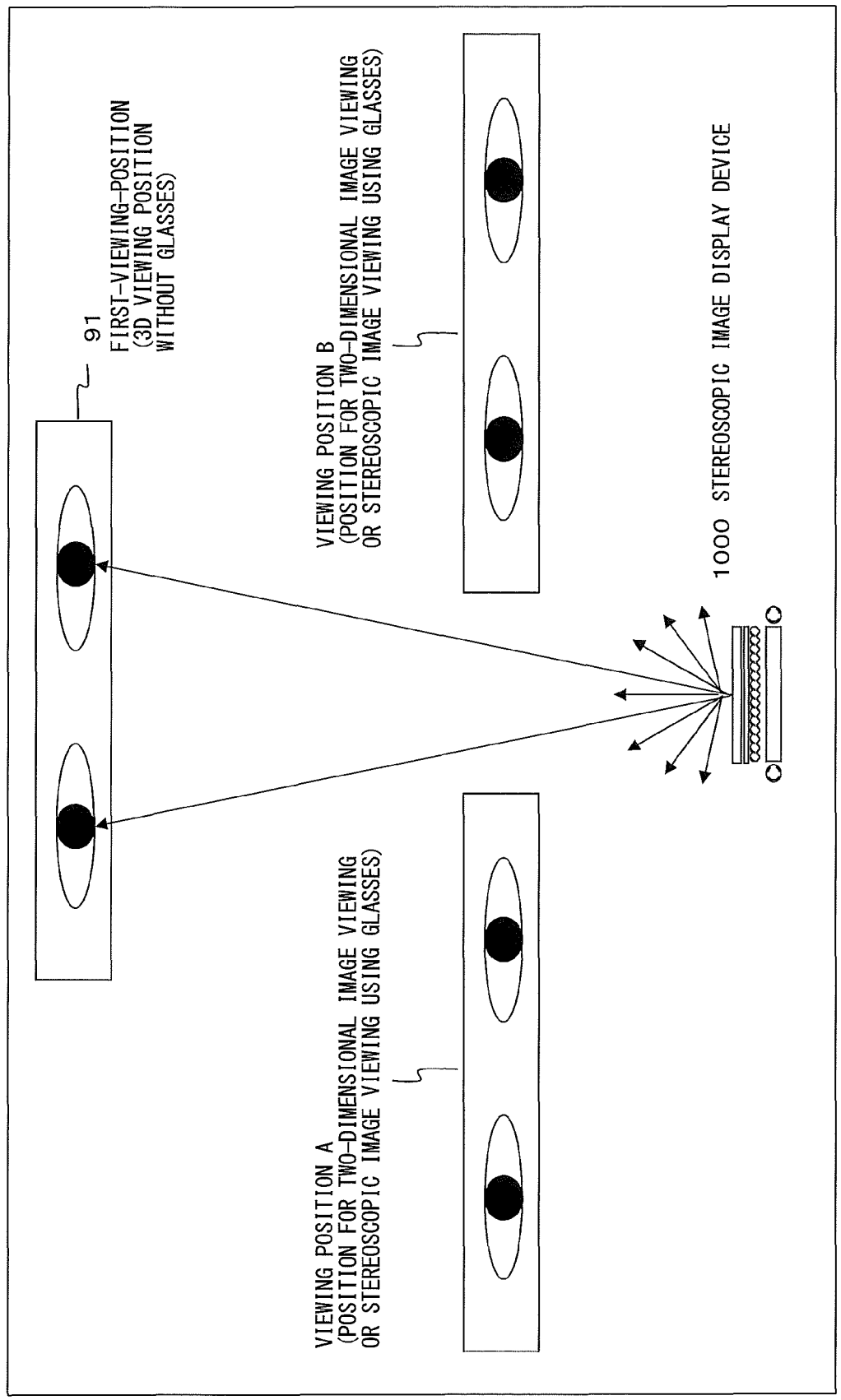
Figure 8:
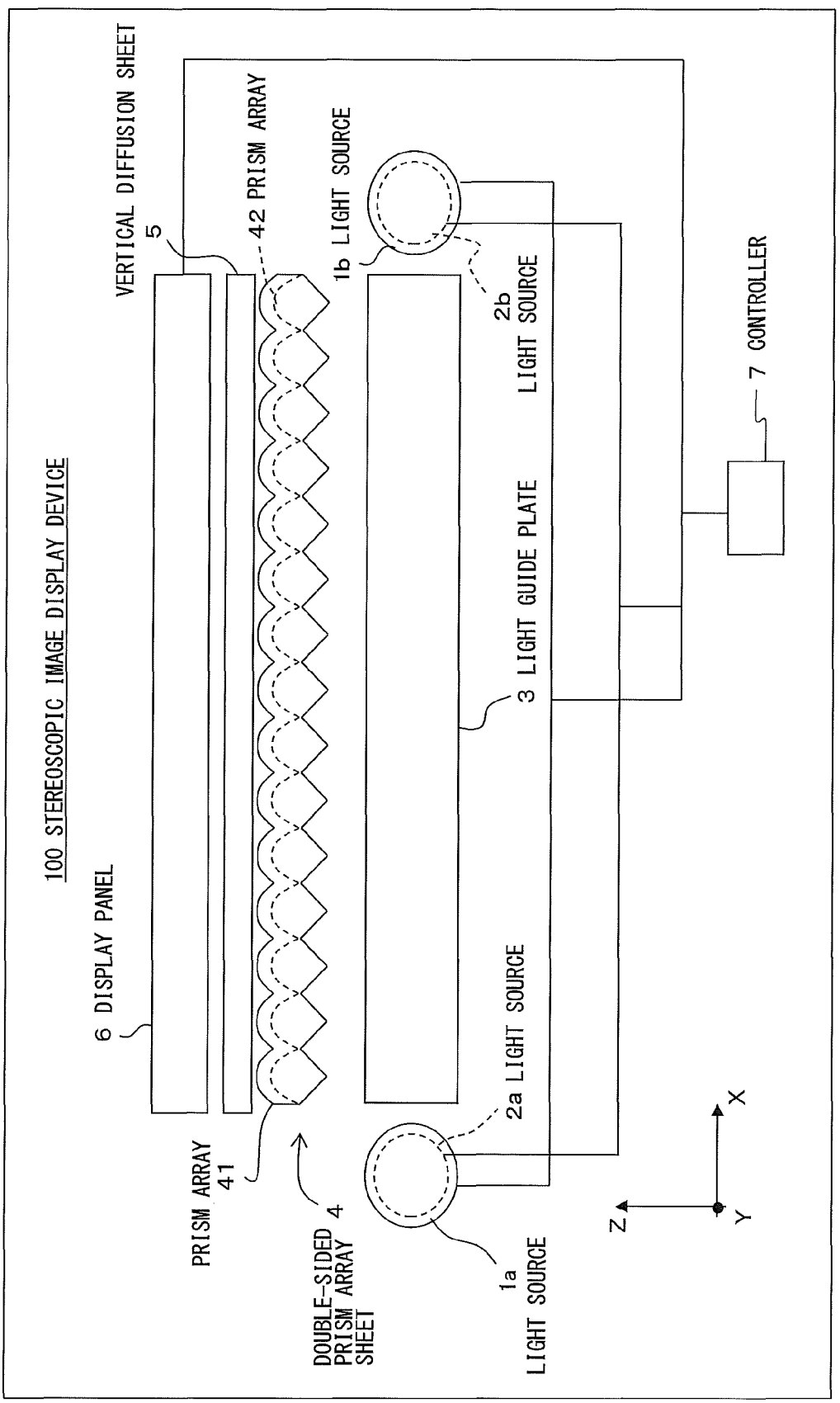

Views (a) and (b) of FIG. 6 are each an X-Z cross sectional view explaining a function of a prism array according to embodiment 1;

FIG. 7 shows a relationship of a stereoscopic image display device, and a first viewing position, a viewing position A, and a viewing position B according to embodiment 1;

FIG. 8 is an X-Z cross sectional view showing a configuration of a stereoscopic image display device according to embodiment 2.

Figure 9:
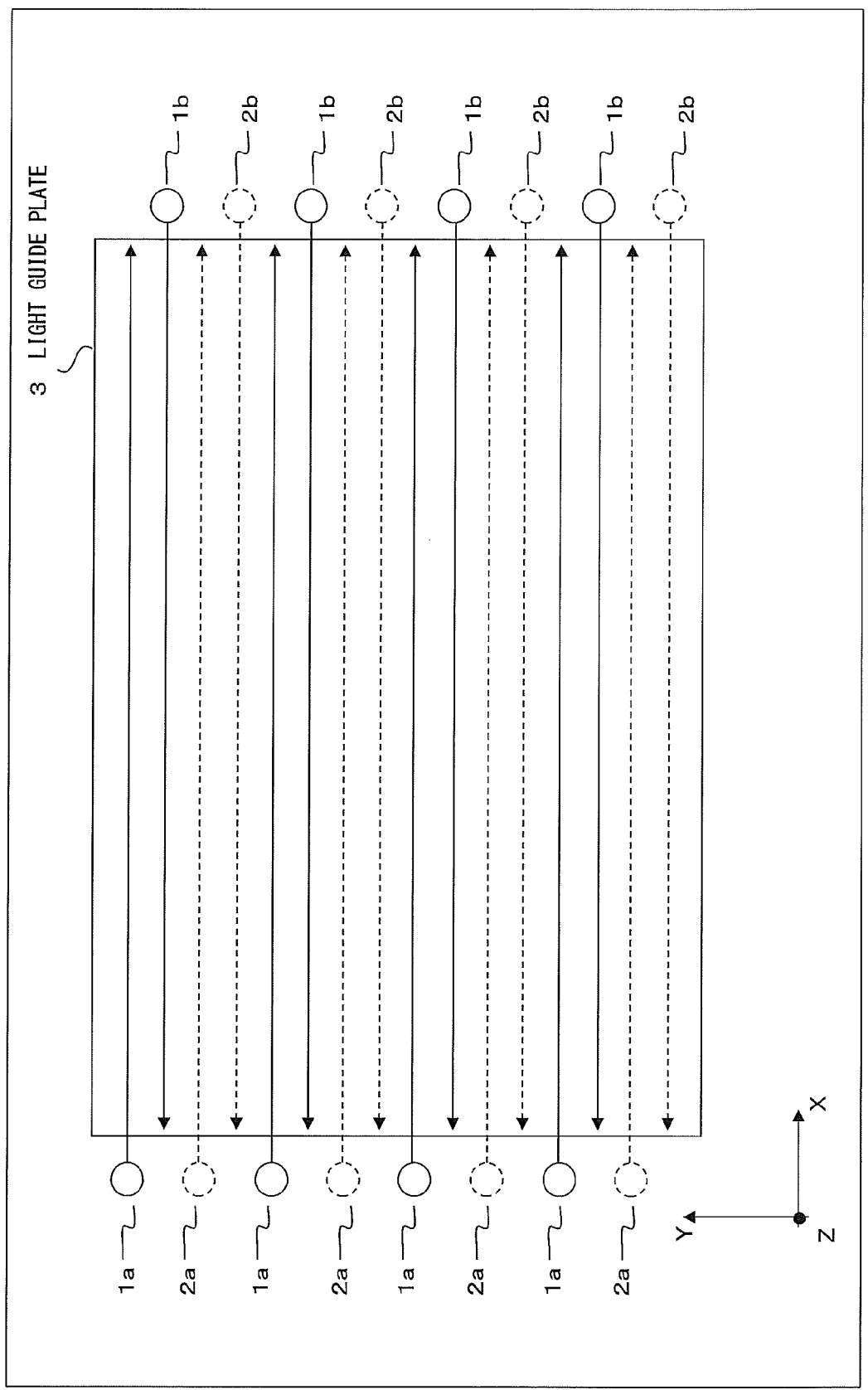
Figure 10:
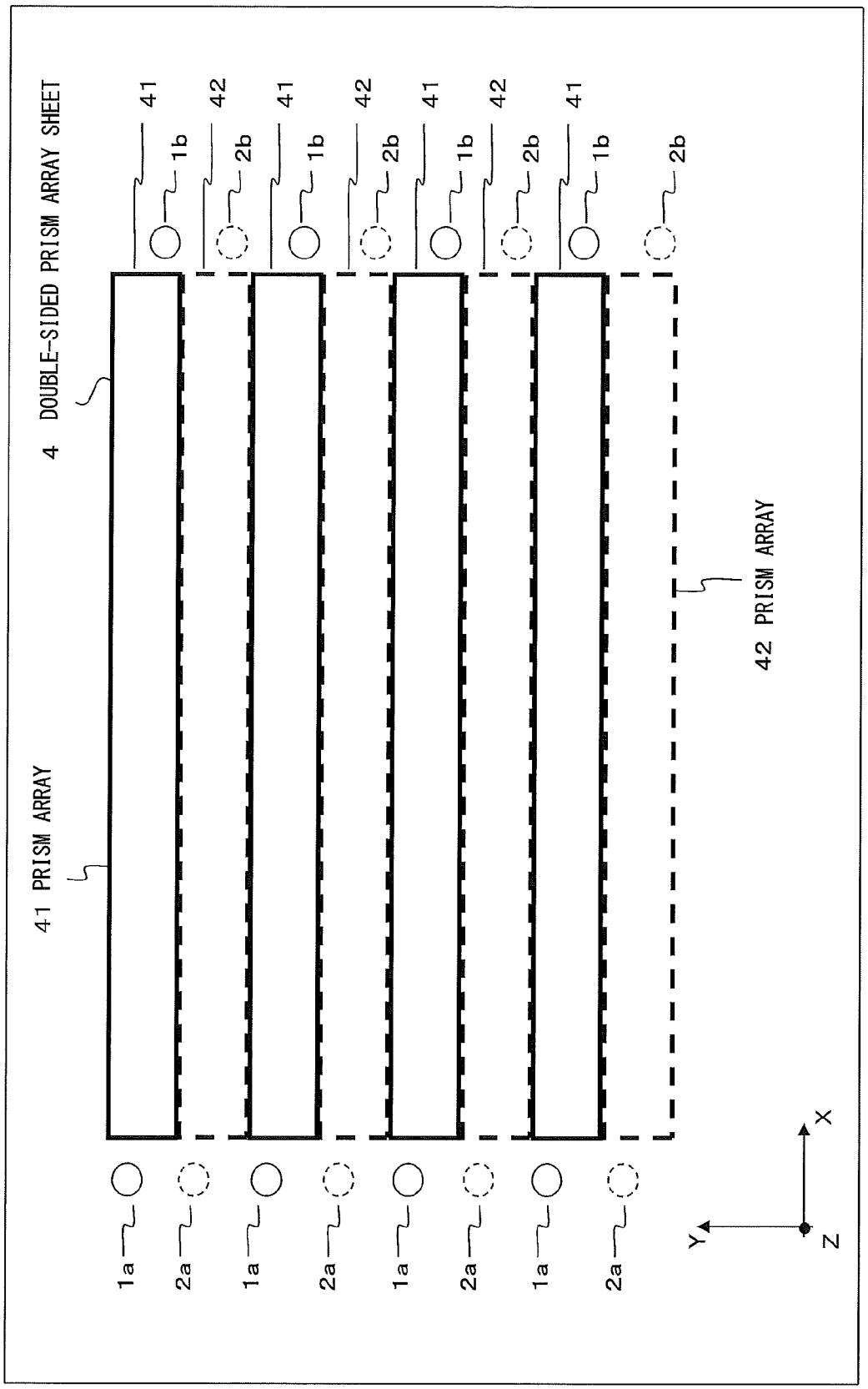
Figure 11:
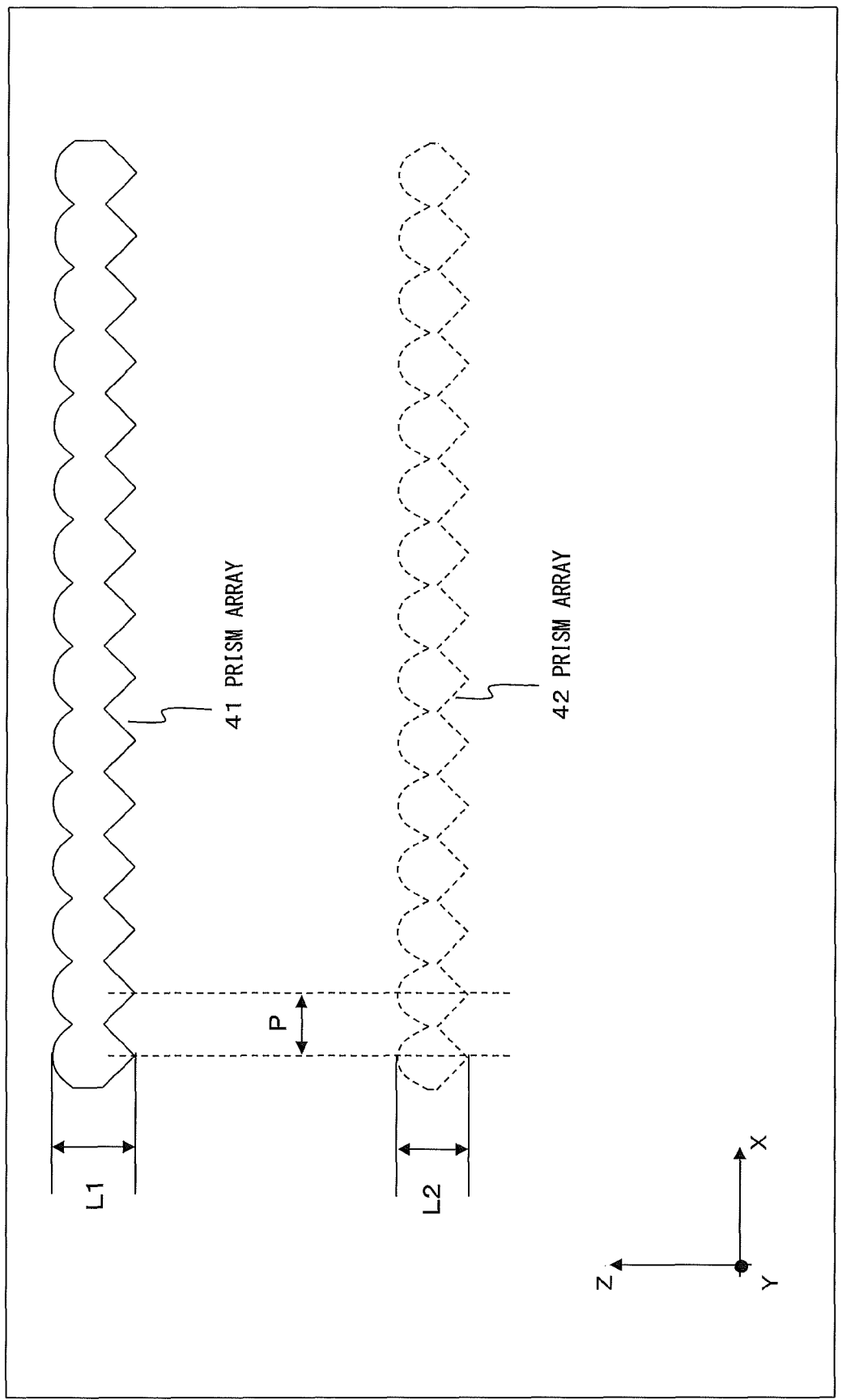
Figure 12:
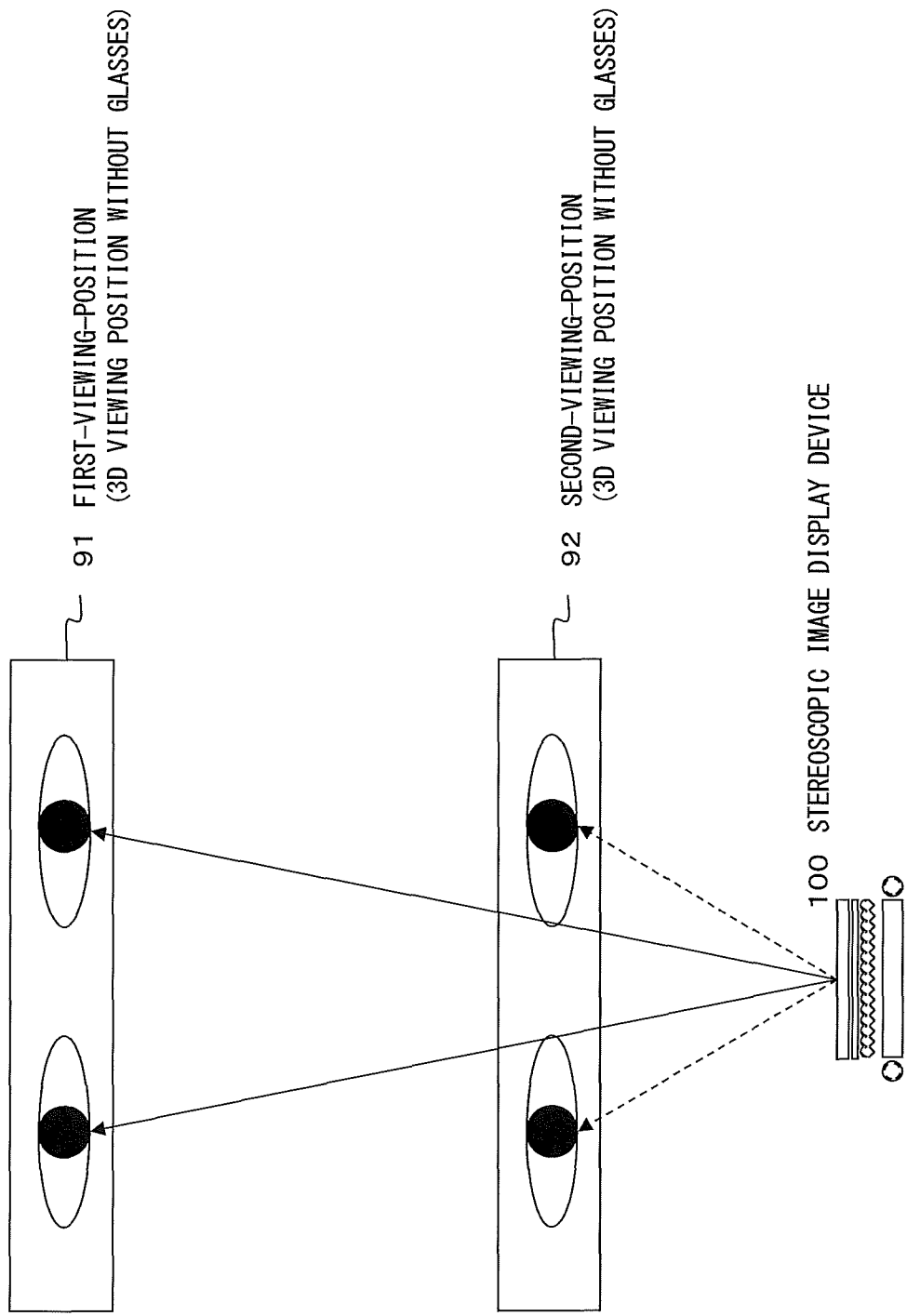
Figure 13:
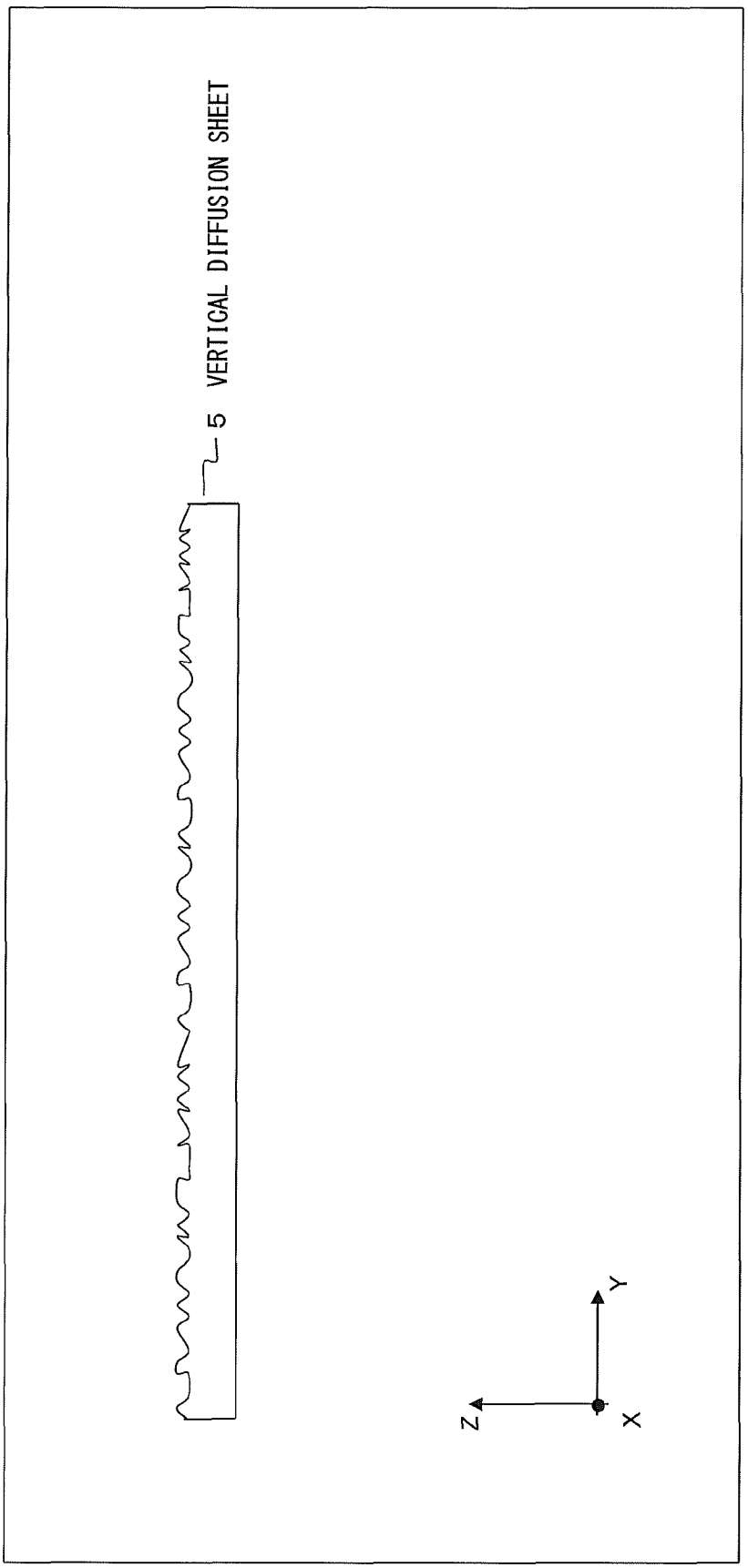

FIG. 9 is an X-Y cross sectional view showing a positional relationship with a light guide plate and LEDs according to embodiment 2;

FIG. 10 is an X-Y cross sectional view showing a configuration of a double-sided prism sheet according to embodiment 2;

FIG. 11 is an X-Z cross sectional view of a first prism array and a second prism array according to embodiment 2;

FIG. 12 shows a relationship between a stereoscopic image display device, and a first viewing position and a second viewing position according to embodiment 2; and FIG. 13 is a Y-Z cross sectional view a vertical diffusion sheet according to embodiment 2.

DESCRIPTION OF THE PREFERRED EMBODIMENTS

Embodiment 1

Figure 1:
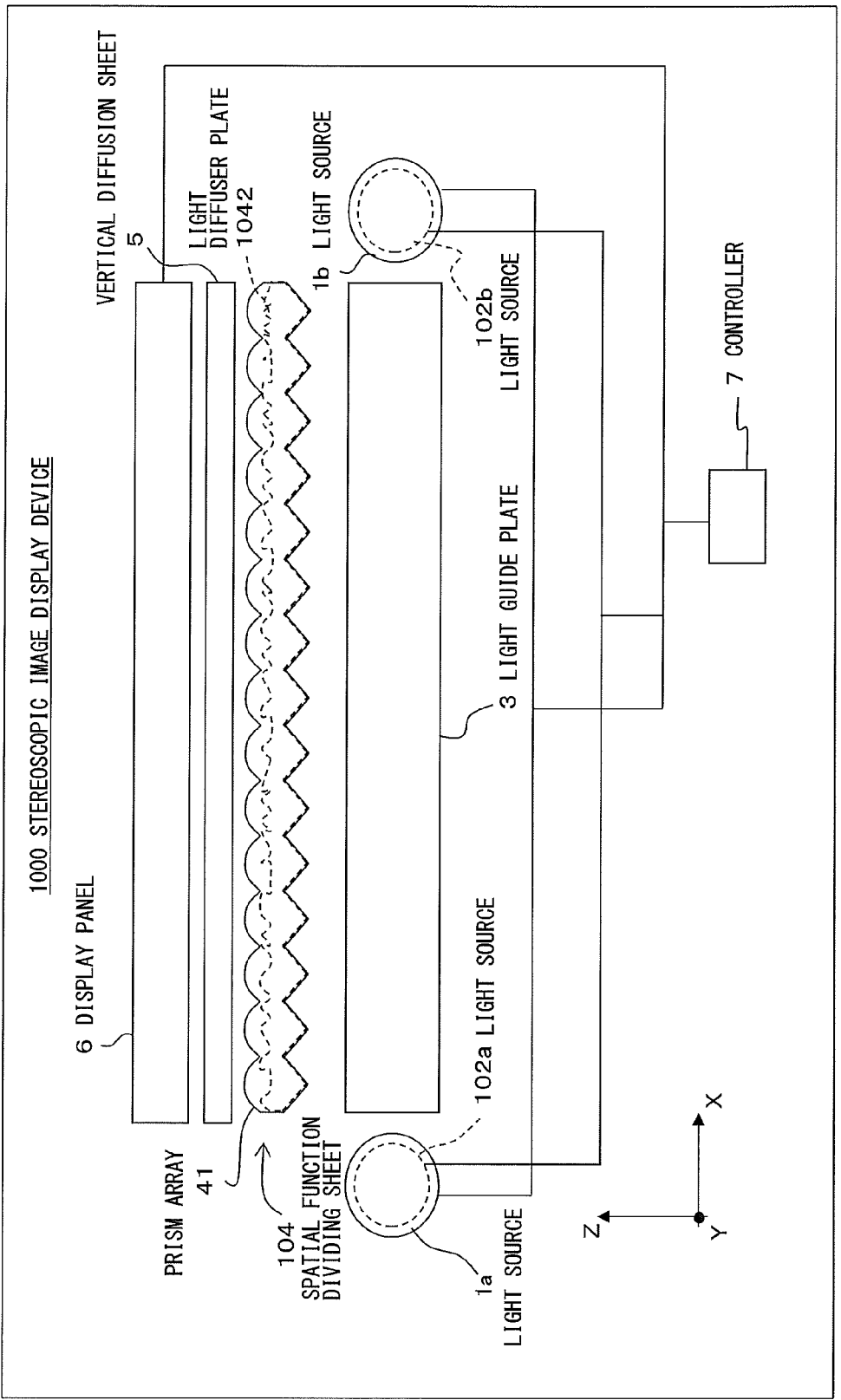
FIG. 1 is an X-Z cross sectional view showing a configuration of a stereoscopic image display device according to embodiment 1.

FIG. 1 is an X-Z cross sectional view schematically showing a stereoscopic image display device 1000 according to an embodiment of the present invention. An X-axis, a Y-axis, and a Z-axis are shown in FIG. 1. Given that the front side of the stereoscopic image display device 1000 is taken to be forward, the direction along the Z-axis is a front-rear direction relative to the stereoscopic image display device 1000, and the positive Z-axis direction is a direction extending frontward from the stereoscopic image display device 1000. The direction along the X-axis is a left-right direction relative to the stereoscopic image display device 1000, and the direction along the Y-axis is an up-down direction (vertical direction). In FIG. 1, the stereoscopic image display device 1000 includes light sources 1a, 1b, 102a, and 102b. The light source 1a is a right eye LED (first right eye light source) used for viewing at a first viewing position. The light source 1b is a left eye LED (first left eye light source) used for viewing at the first viewing position. The light source 102a is a right eye LED (second right eye light source) used for viewing a two-dimensional image. The light source 102b is a left eye LED (second left eye light source) used for viewing the two-dimensional image. Further, the stereoscopic image display device 1000 includes a light guide plate 3, a spatial function dividing sheet 104, a vertical diffusion sheet 5, a display panel 6, and a controller 7. The above two-dimensional image is a conventional type of image (non-stereoscopic image), which is not a stereoscopic image.

Figure 2:
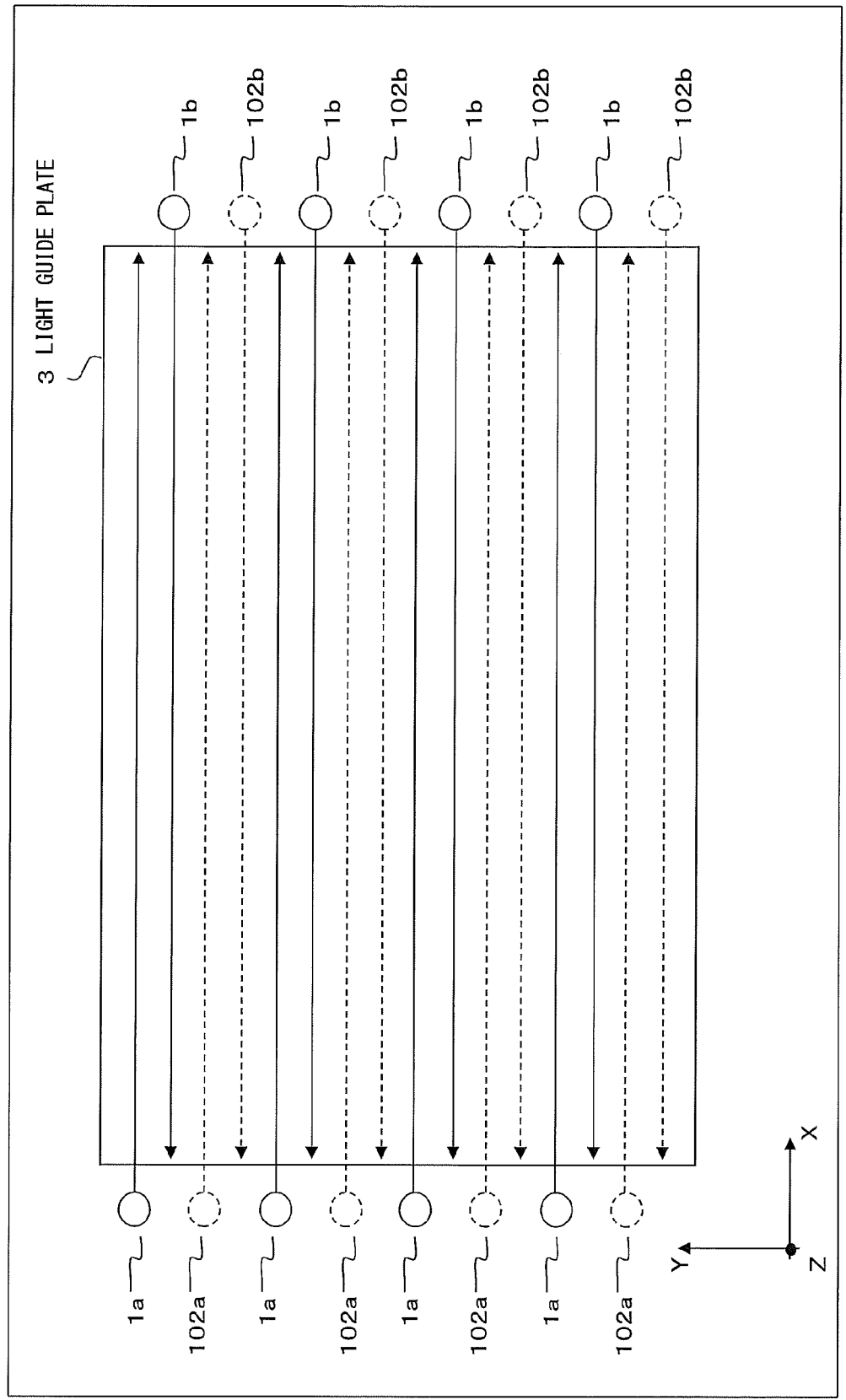
FIG. 2 is an X-Y cross sectional view showing a positional relationship between a light guide plate and LEDs according to embodiment 1.

Next, operations and the components of the stereoscopic image display device 1000 will be described in detail. FIG. 2 is an X-Y cross sectional view of the light source 1a, the light source 1b, the light source 102a, and the light source 102b, which compose a light source of the present embodiment, and the light guide plate 3. The light source 1a and the light source 1b are arranged on light-incident surfaces of the light guide plate, the light-incident surfaces facing each other. The light source 102a and the light source 102b are arranged in a similar manner. The light source 1a and the light source 102a are alternately arranged to one light-incident surface side of the light guide plate 3. The light source 1b and the light source 102b are alternately arranged to an opposite light-incident surface side of the light guide plate 3 to which side the light source 1a and the light source 102a are arranged.

In the present embodiment, four LEDs are used for each of the light sources 1a, 1b, 102a, and 102b. The light sources 1a, 1b, 102a, and 102b can be independently controlled to be lit by the controller 7.

For convenience, these LEDs may be referred to as a light source, the light sources 1a and 102a may be referred to as a right light source, and the light sources 1b and 102b may be referred to as a left light source. Moreover, the spatial function dividing sheet 104 may be referred to as a luminous intensity distribution system.

When displaying a stereoscopic image, the controller 7 controls the light source 1a and the light source 1b so as to be alternately lit, synchronized with a right eye image of a stereoscopic image to be displayed, and with a left eye image of the stereoscopic image to be displayed, respectively. When displaying a two-dimensional image, the controller 7 controls the light source 102a and the light source 102b so as to be lit simultaneously. Alternatively, the controller 7 controls the light source 102a and the light source 102b so as to be alternately lit, synchronized with a right eye image and a left eye image of a stereoscopic image to be displayed, respectively. In FIG. 2, light beams emitted from the light source 1a and the light source 1b are indicated by solid lines, respectively, and light beams emitted from the light source 102a and the light source 102b are indicated by dotted lines, respectively.

Figure 3:
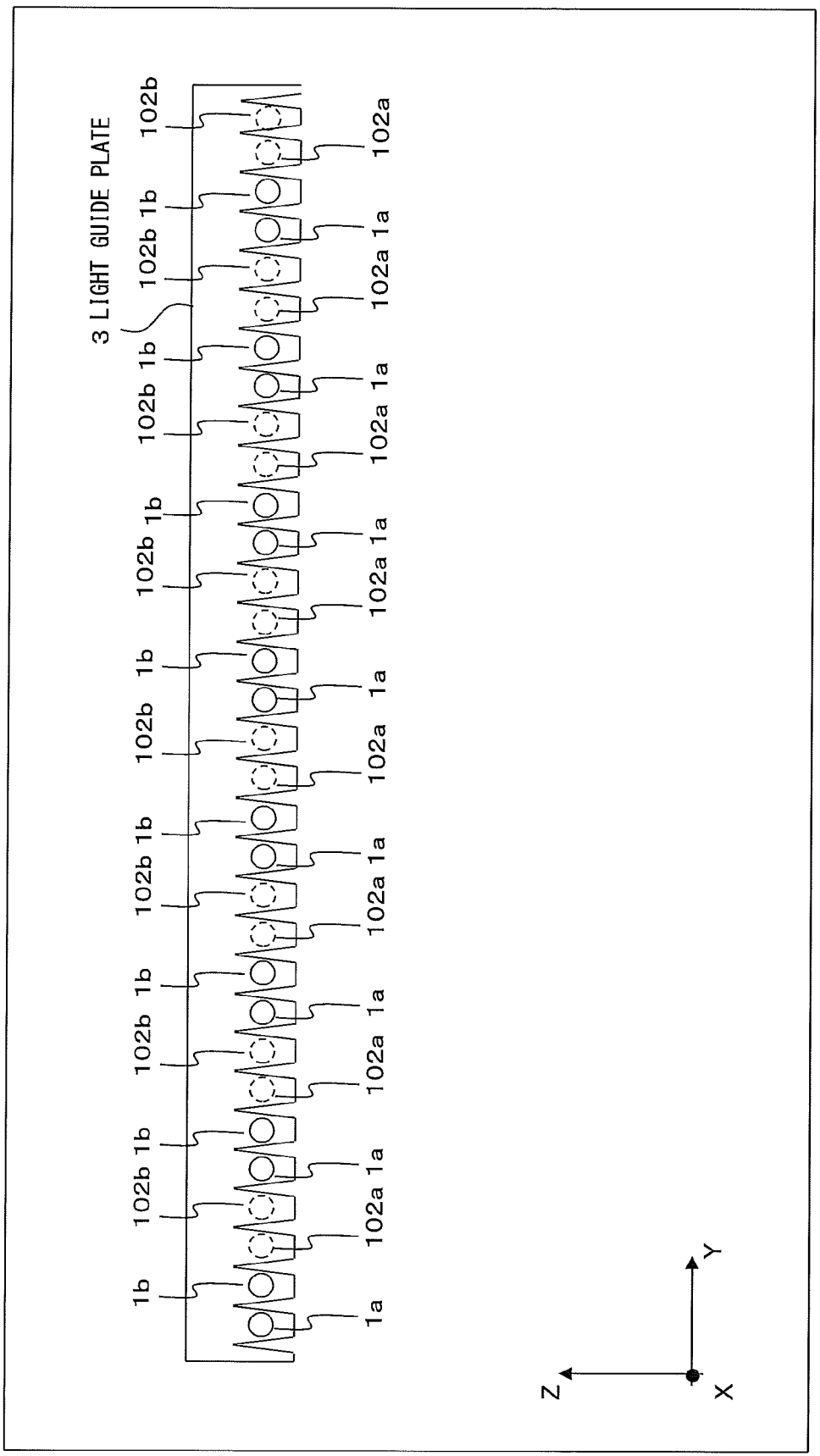
FIG. 3 is a Y-Z cross sectional view showing a positional relationship between a light guide plate and LEDs according to embodiment 1.

FIG. 3 is a Y-Z cross sectional view showing a positional relationship between the light guide plate 3, and the light source 1a, the light source 1b, the light source 102a, and the light source 102b. V-shaped grooves are provided in the light guide plate 3. That is, at least one surface of the light guide plate 3 has projections and recesses and each recess has a tapered shape in the depth direction of the light guide plate 3. The light source 1a, the light source 1b, the light source 102a, and the light source 102b are arranged between the grooves. By this configuration, light emitted from the light source 1a, the light source 1b, the light source 102a, and the light source 102b propagates in the X direction, without diffusing in the Y direction, by repeating total reflection at walls of the V-shaped grooves (recesses).

Figure 4:
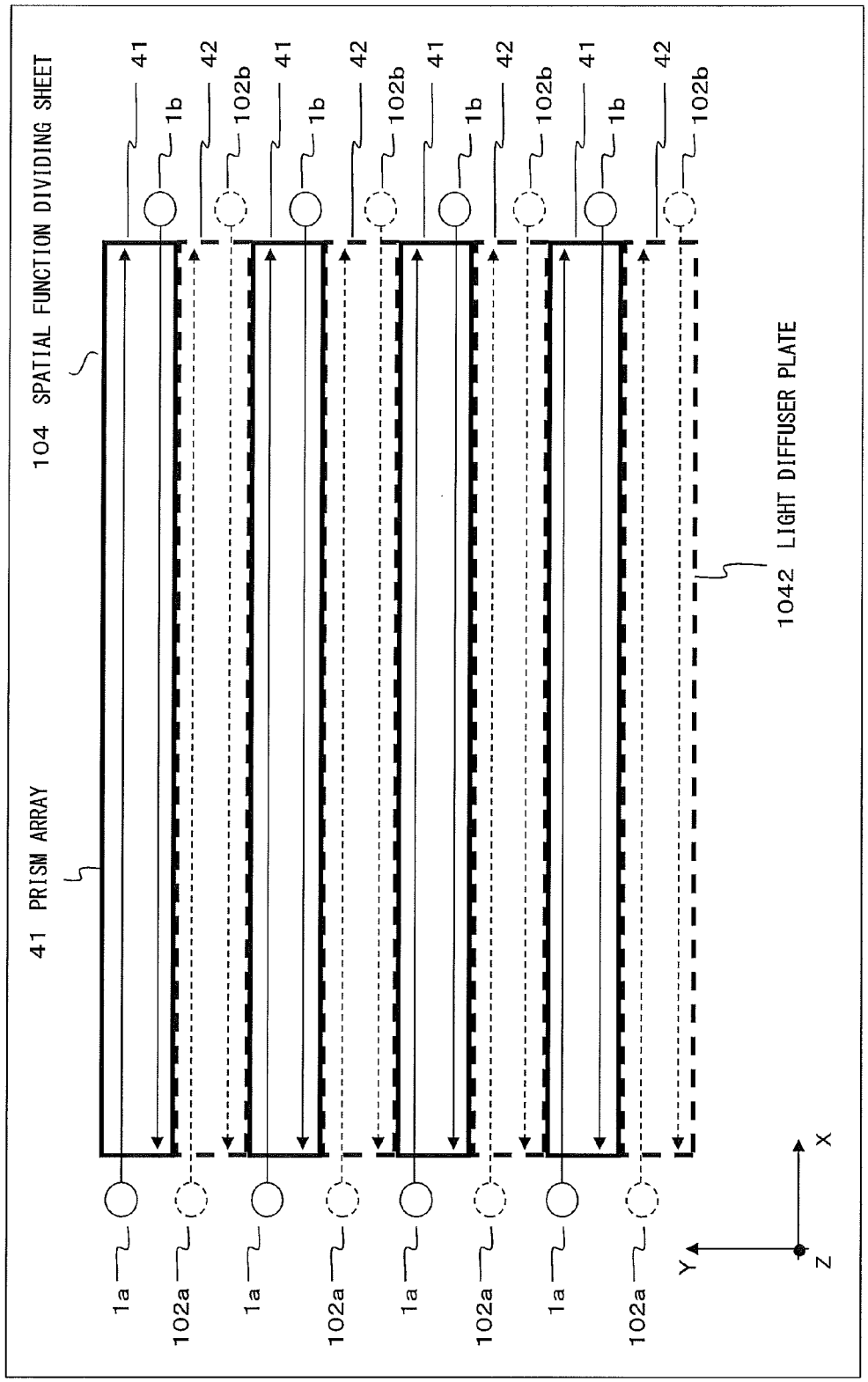
FIG. 4 is an X-Y cross sectional view showing a configuration of a spatial function dividing sheet according to embodiment 1.

FIG. 4 shows an X-Y cross sectional view of the spatial function dividing sheet 104. The spatial function dividing sheet 104 is composed of a prism array 41 (indicated by solid lines) used for viewing at the first viewing position, and a light diffuser plate (light diffuser) 1042 (indicated by dotted lines) which is conventionally used. Each of the prism array 41 and the light diffuser plate 1042 extends in a linear form in the X direction. It should be noted that both are not necessarily needed to extend in a linear form, and may have a first direction as an extension direction. Here, a plurality of the prism arrays 41 and a plurality of the light diffuser plates 1042 are arranged such that each of the plurality of the prism arrays 41 and each of the plurality of the light diffuser plates 1042 are alternately arranged in the Y-axis direction. A Y-direction dimension of the prism array 41 (which is the line width thereof) and a Y-direction dimension of the light diffuser plate 1042 (which is the line width thereof) may be freely set. When the Y-direction dimension of the light diffuser plate 1042 is set greater than the Y-direction dimension of the prism array 41, the brightness of an image displayed at the time of two-dimensional image viewing can be improved, with respect to which image, the amount of light per viewer was conventionally reduced than that for stereoscopic image viewing. In other words, image light gathers in a specific position at the time of stereoscopic image viewing, whereas, with respect to two-dimensional image light which disperses in the viewing space, the brightness of the two-dimensional image can be increased by increasing the amount of light that passes the light diffuser plate 1042.

Figure 5:
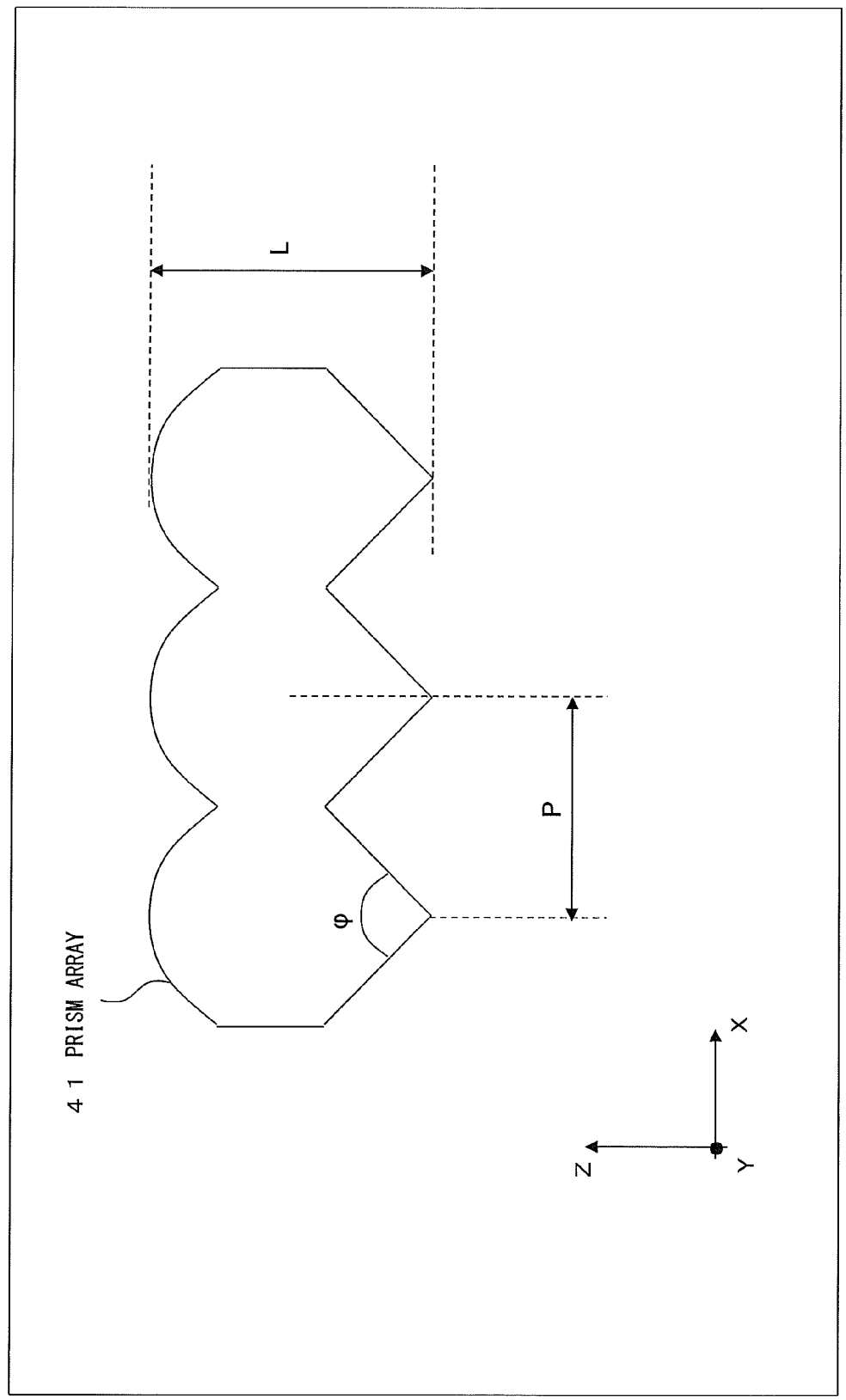
FIG. 5 is a partial X-Z cross sectional view of a prism array according to embodiment 1.

FIG. 5 is a magnified Z-X cross sectional view of the prism array 41. The prism array 41 includes: a plurality of triangular projections arranged in a line, each having a vertex angle along the light-incident surface side; and a plurality of cylindrical lenses arranged in a line, each forming a bulging shape along the light-emitting surface side. Each cylindrical lens surface arranged on the light emitting surface of the prism array 41 has power in the X-axis direction, and the curvature of the cylindrical lens surface is set such that the focal distance of the lens is equal to a thickness L of the double-sided prism sheet. A pitch between the respective prisms of the prism array 41 is defined as P, and the vertex angle of each prism provided on the light-incident surface is defined as Φ. Functions of the prism array 41 will be described in detail below.

A view (a) of FIG. 6 is a view for explaining the behavior of light (light beam) that is emitted from the light guide plate 3 and enters the prism array 41. The light that has been emitted from the light source 1*a* and passed through the light guide plate 3 enters the prism array 41 of the spatial function dividing sheet 104. Immediately after being emitted from the light guide plate 3, the light (light beam) advances rightward in the figure. In other words, when viewed from the frontward end, light emitted from the light guide plate 3 enters the prism array 41 from a right-rear direction.

After entering the prism array 41, the light beam is totally reflected by an inclined surface 5*a*1 of the prism array 41, and then advances leftward (reverse direction) in the figure and is emitted from a cylindrical lens surface. In other words, when viewed from the frontward end, the light totally reflected by the inclined surface 5*a*1 is emitted in a right-forward direction.

An axis line 5*a*2 is a line that passes through the vertexes of the plurality of prisms provided on the light-incident surface of the prism array 41. When the light beam totally reflected by the inclined surface 5*a*1 of the prism array 41 is extended in a direction opposite to the light advancing direction to the axis line 5*a*2, the light beam totally reflected by the inclined surface 5*a*1 of the prism and advancing toward a cylindrical lens surface can be regarded as being equivalent to a light beam emitted from an area 5*a*3 on the axis line 5*a*2. Therefore, the light totally reflected by the inclined surface 5*a*1 and advancing toward a cylindrical lens surface advances leftward, in the figure, relative to an optical axis 5*a*4 that is orthogonal to the axis line 5*a*2 and that passes through the vertexes of the prisms on the axis line 5*a*2.

As shown in (b) of FIG. 6, the behavior of the light beam can be regarded to be identical to that of light (light beam) emitted from one point in the area 5*a*3 on the axis line 5*a*2 entering a cylindrical lens part. Since the axis line 5*a*2 coincides with the position of the focal plane of the cylindrical lens part, when an emission angle of the light that has been emitted from a given point of the area 5*a*3 and then been emitted from the cylindrical lens is defined as Θ, Θ can be calculated from a formula below.

$$\Theta = -\tan^{-1}\left(\frac{nd}{L}\right) \quad \text{[Formula 1]}$$

Within Formula 1, n is a refractive index of a material forming the prism array 41. L is a thickness of the prism array 41, which coincides with the focal distance of the cylindrical lens, as described above. d is a distance between a given point in the area 5*a*3 and the optical axis. Therefore, the light that has been totally reflected by the inclined surface 5*a*1 and has passed through the cylindrical lens surface is emitted leftward in the figure with a narrow luminous intensity distribution, and reaches the right eye of the viewer. With respect to (a) of FIG. 6, the light from the light source 1*a* has been described. However, light from the light source 1*b* follows a path symmetrical to that of the light from the light source 1*a*, and reaches the left eye of the viewer.

As described above, the spatial function dividing sheet 104 is a luminous intensity distribution system having a light-incident surface and a light-emitting surface, and in which, given that with respect to the light-emitting surface a positive Z-direction side to which light is emitted is taken to be frontward, the light-incident surface is arranged rearward of the light-emitting surface when viewed from the frontward end, the luminous intensity distribution system distributing light having entered through the light-incident surface and emitting the light through the light-emitting surface. The prism array 41 is a first optical element extending in the X direction (first direction), and distributing, given that the X direction is taken to be leftward-rightward (horizontal direction), light having entered the light-incident surface from a right-rear direction and emitting the light through the light-emitting surface toward a right-forward direction when viewed from the frontward end, and distributing light having entered the light-incident surface through a left-rear direction and emitting the light through the light-emitting surface toward a left-forward direction when viewed from the frontward end. Moreover, the light diffuser plate 1042 is a second optical element extending in the X direction and diffusing light having entered the light-incident surface and emitting the light through the light-emitting surface. The prism array 41 and the light diffuser plate 1042 are arranged in parallel with each other in an up-down direction (vertical direction) when viewed in a front-rear direction. Here, the front-rear direction is the Z direction and the up-down direction is the Y direction.

A combination of the control operations performed by the controller 7 and the spatial function dividing sheet 104 allows the stereoscopic image display device 1000 to perform three types of image displays described below.

(1) The controller 7 controls the light source 1*a* and the light source 1*b* so as to be alternately lit, synchronized with a right eye image and a left eye image of a stereoscopic image to be displayed. By means of the prism array 41 of the spatial function dividing sheet 104, light emitted by the light source 1*a* and light emitted by the light source 1*b* allow right eye image light and left eye image light to enter the right eye and the left eye of the viewer viewing at a first viewing position, respectively. Accordingly, the viewer viewing the image at the first viewing position can perceive a stereoscopic image with naked eyes.

(2) The controller 7 controls the light source 102*a* and the light source 102*b* so as to be alternately lit, synchronized with a right eye image and a left eye image of a stereoscopic image to be displayed, respectively. Light emitted by the light source 102*a* and light emitted by the light source 102*b* enter the light diffuser plate 1042 of the spatial function dividing sheet 104. The light having entered the light diffuser plate 1042 is diffused to be emitted in accordance with a diffusing characteristic of the light diffuser plate 1042, to the front surface of the stereoscopic image display device 1000. In this case, since light of the image to be displayed is diffused to be emitted, left eye image light and right eye image light cannot be caused to selectively enter the left and right eyes of the viewer as in the case of (1). Therefore, in this case, the viewer uses stereoscopic image viewing glasses that assist the viewer to view the stereoscopic image. Stereoscopic image viewing glasses has a shutter function for adjusting light entering the left and right eyes. By controlling opening and closing of the shutter, synchronized with displays of the left image and the right image for the stereoscopic image display device 1000, the viewer can perceive the stereoscopic image.

(3) When the stereoscopic image display device displays a two-dimensional image, the controller 7 controls the light source 102a and the light source 102b so as to be simultaneously lit. Light emitted by the light source 102a and light emitted by the light source 102b enter the light diffuser plate 1042 of the spatial function dividing sheet 104. The light diffuser plate 1042 diffuses the light to be emitted to the front surface of the stereoscopic image display device 1000. Accordingly, the two-dimensional image light is diffused and the two-dimensional image is displayed on the front surface of the stereoscopic image display device 1000.

As described above, according to the present embodiment, it is possible to provide three types of image viewing, that is, (1) stereoscopic image viewing with naked eyes, (2) stereoscopic image viewing using glasses, and (3) two-dimensional image viewing. Further, in the case of (2) the stereoscopic image viewing using glasses, and (3) two-dimensional image viewing, image light is diffused to the front surface of the stereoscopic image display device 1000 by means of the light diffuser plate 1042. Therefore, the viewer can view a desired image in a wider area.

FIG. 7 shows a relationship between the stereoscopic image display device 1000 and viewing positions of a viewer according to the present embodiment. A viewing position 91 represents a first viewing position. In this case, the viewer can view a stereoscopic image with naked eyes. However, such stereoscopic image viewing is limited to this viewing position 91. A viewing position A and a viewing position B represent a second viewing position positions where a two-dimensional image can be viewed, or where a stereoscopic image can be viewed with glasses. In this case, at both of the viewing position A and the viewing position B, the viewer can view a two-dimensional image or a stereoscopic image using glasses.

Embodiment 2

FIG. 8 is an X-Z cross sectional view schematically showing a configuration of a stereoscopic image display device 100 according to one embodiment of the present invention. In FIG. 8, an X-axis a Y-axis, and a Z-axis are shown. The directions along the respective axes refer to the same as those in FIG. 1. In FIG. 8, the stereoscopic image display device 100 includes light sources 1a, 1b, 2a, and 2b. The light source 1a is a right eye LED (first right eye light source) used for viewing at a first viewing position. The light source 1b is a left eye LED (first left eye light source) used for viewing at the first viewing position. The light source 2a is a right eye LED (second right eye light source) used for viewing at a second viewing position. The light source 2b is a left eye LED (second left eye light source) used for viewing at the second viewing position. The stereoscopic image display device 100 further includes light guide plate 3, a double-sided prism array sheet 4, a vertical diffusion sheet 5, a display panel 6, and a controller 7. The double-sided prism array sheet 4 includes a prism array (first prism array) 41 used for viewing at the first viewing position, and a prism array (second prism array) 42 used for viewing at the second viewing position.

Next, operations and the components of the stereoscopic image display device 100 will be described in detail. FIG. 9 is an X-Y cross sectional view of the light sources 1a, 1b, 2a, and 2b, which compose a light source, and the light guide plate 3 according to the present embodiment. The light source 1a and the light source 1b are arranged on light-incident surfaces of the light guide plate, the light-incident surfaces facing each other. The light source 2a and the light source 2b are arranged in a similar manner. The light source 1a and the light source 2a are alternately arranged to one light-incident surface side of the light guide plate 3. The light source 1b and the light source 2b are alternately arranged to an opposite light-incident surface side of the light guide plate 3 to which side the light source 1a and the light source 2a are arranged. In the present embodiment, four LEDs are used for each of the light sources 1a, 1b, 2a, and 2b.

For convenience, the LEDs may be referred to as a light source, the light sources 1a and 2a may be referred to as a right light source, and the light sources 1b and 2b may be referred to as a left light source. Further, the double-sided prism array sheet 4 may be referred to as a luminous intensity distribution system.

The controller 7 controls the light sources 1a, 1b, 2a, and 2b to be lit independently. The controller 7 alternately illuminates the light source 1a and the light source 1b, synchronized with a right eye image of a stereoscopic image to be displayed and a left eye image of the stereoscopic image to be displayed, respectively. The controller 7 alternately illuminates the light source 2a and the light source 2b, synchronized with the right eye image and the left eye image, respectively, in a similar manner. Further, in accordance with a viewing position of the viewer of the stereoscopic image, the controller 7 switches use of the light sources 1a and 1b to use of light sources 2a and 2b, and vise versa. FIG. 9 shows light beams emitted from the light source 1a and the light source 1b indicated by solid lines, respectively, and light beams emitted from the light source 2a and the light source 2b are indicated by dotted lines, respectively.

The positional relationship between the light guide plate 3, and the light sources 1a, 1b, 2a, and 2b is equivalent to the relationship in FIG. 3 in which the light source 102a is replaced with the light source 2a, and the light source 102b is replaced with the light source 2b.

The Z-X cross section of the prism array 41 and the prism array 42 of the double-sided prism array sheet 4 is the same as that in FIG. 5.

The behaviors of light (light beam) that has been emitted from the light guide plate 3 and enters the double-sided prism array sheet 4 are the same as those in (a) and (b) in FIG. 6.

FIG. 10 shows an X-Y cross sectional view of the double-sided prism array sheet 4. In FIG. 10, LEDs 1a, 1b, 2a, and 2b are also shown. In the present embodiment, as shown in FIG. 10, the double-sided prism array sheet 4 includes a plurality of the prism arrays 41 (indicated by solid lines) and a plurality of the prism arrays 42 (indicated by dotted lines) arranged such that each of the plurality of the prism arrays 41 and each of the plurality of the prism arrays 42 are alternately arranged along the Y-direction. Each prism array 41 and each prism array 42 extends in a linear form in the X direction. However, the two need not necessarily extend in a linear form, and may have a first direction as an extension direction. Most of the light emitted from the light source 1a and from the light source 1b enters the prism array 41 via the light guide plate 3. Similarly, most of the light emitted from the light source 2a and from the light source 2b enters the prism array 42 via the light guide plate 3.

FIG. 11 shows X-Z cross sectional views of the prism array 41 and the prism array 42. The pitch P between prisms forming the prism array 41 is the same as the pitch P between prisms forming the prism array 42. Further, as in the case of the prism array 41, the focal distance of the prism array 42 is set to be equal to the thickness L of the prism sheet. In the present embodiment, the focal distance of the prism array 42 is set shorter than the focal distance of the prism array 41. Therefore, a focal distance L2 of the prism array 42 is smaller than a focal distance L1 of the prism array 41.

As apparent from the formula for calculating Θ, the smaller the focal distance L is, the greater the emission angle of the light emitted from the double-sided prism array sheet 4 becomes. With a greater emission angle, it is possible to cause the right eye image light and the left eye image light to enter the right eye and the left eye, respectively, at a shorter viewing distance. In the present embodiment, since the focal distance L2 of the prism array 42 is set to a smaller value than the focal distance L1 of the prism array 41, a second viewing position is nearer to the stereoscopic image display device 100 than a first viewing position is, as shown in FIG. 12.

As described above, the double-sided prism array sheet 4 is a luminous intensity distribution system having a light-incident surface and a light-emitting surface, and in which, given that with respect to the light-emitting surface a positive Z-direction side to which light is emitted is taken to be frontward, the light-incident surface is arranged rearward of the light-emitting surface when viewed from the frontward end, the luminous intensity distribution system distributing light having entered through the light-incident surface and emitting the light through the light-emitting surface. The prism array 41 and the prism array 42 are a plurality of types of optical elements with different respective construct-image positions, the plurality of types of optical elements extending in the X direction (first direction), and distributing, given that the X direction is taken to be leftward-rightward (horizontal direction), light having entered the light-incident surface from a right-rear direction and emitting the light through the light-emitting surface toward a right-forward direction when viewed from the frontward end, and distributing light having entered the light-incident surface from a left-rear direction and emitting the light through the light-emitting surface toward a left-forward direction when viewed from the frontward end. The prism array 41 and the prism array 42 are arranged in parallel with each other in an up-down direction (vertical direction) when viewed in a front-rear direction. Here the front-rear direction is the Z direction and the up-down direction is the Y direction.

Next, a vertical diffusion sheet 5 will be described with reference to FIG. 13. FIG. 13 is a Y-Z cross sectional view of the vertical diffusion sheet 5. The light-emitting surface of the vertical diffusion sheet 5 is rough as shown in the Y-Z cross section thereof. Meanwhile, the X-Z cross section of the vertical diffusion sheet 5 is flat as shown in FIG. 8. Therefore, light that has passed through the vertical diffusion sheet is diffused only in the Y direction (defined as vertical direction). Therefore, even when the viewer moves the viewpoint in the vertical direction, the viewer can view the image.

As described above, according to the present embodiment, in viewing a stereoscopic image using a naked-eye system, it is possible to provide a plurality of viewing areas in which the stereoscopic image can be viewed. It should be noted that, the present embodiment provides two viewing positions, that is, the first viewing position 91 and a second viewing position 92. However, two or more viewing positions can be provided. In that case, the shapes of prism arrays forming the double-sided prism array sheet 4 are arranged, optimized for the respective viewing positions.

The stereoscopic image display device 100 includes a detection device provided with a camera that, for example, recognizes the face of the viewer or tracks the position of the eyes. By the detection device detecting the viewing position of the viewer and by the controller 7 driving a light source corresponding to the detected viewing position, the viewer located at the viewing position can view the stereoscopic image. Only a light source that corresponds to one detected viewing position may be driven to provide a stereoscopic image only for said one viewing position. Alternatively, in a case where a plurality of viewing positions have been detected, images are simultaneously provided to the viewers at the respective viewing positions by driving light sources that correspond to the respective viewing positions in a time-division manner. Thus, a configuration is possible in which light sources are driven in a time-division manner so as to discriminate viewing positions, and light sources are driven in a time-division manner for each of the left and right eyes at each viewing position. Further, in a case where the content given to the stereoscopic image display device 100 is a two-dimensional image, the stereoscopic image display device 100 may be configured to provide a pseudo stereoscopic image by converting the two-dimensional image data into stereoscopic image data.

Moreover, in a case where a plurality of viewing positions are arranged in a front-rear direction from the screen as shown in FIG. 12, if the viewing positions are set, also shifted in the vertical direction, the viewers at the respective viewing positions can be simultaneously detected by the detection device, and the viewers can simultaneously view the stereoscopic image at the respective viewing positions. Moreover, by shifting the horizontal positions of the optical axes 5a4 in FIG. 6 between prism arrays that correspond to a plurality of viewing positions, the plurality of viewing positions that allows stereoscopic image viewing can be set along the horizontal direction of the screen. In a case where a plurality of viewing positions are set, in the front-rear direction, in the horizontal direction, or in the front-rear direction and the horizontal direction, it is possible to change the parallax between the eyes of a stereoscopic image for each viewing position. As a result, for example, a stereoscopic sense appropriate for each viewing position can be obtained. Examples of methods for changing the parallax between the eyes of a stereoscopic image for each viewing position include a method using data prepared in advance in the contents, and a method for generating data in the stereoscopic image display device 100.

Moreover, according to the present embodiment, by adjusting focal distances of prism arrays for viewing positions, the prism arrays being included in the double-sided prism array sheet 4, it is possible to change the viewing distance from the stereoscopic image display device 100 to a corresponding viewing position.

In the present embodiment, the light sources 1a and 1b for the first viewing position and the light sources 2a and 2b for the second viewing position are described as being separated from each other. However, the description of the present embodiment is not limited thereto. A common light source may be used as the light source 1a and the light source 2a, and a common light source may be used as the light source 1b and the light source 2b. In this case, the number of LEDs used as light sources can be reduced. On the other hand, when these are implemented by an individual LED, it is possible to control image viewing at the first viewing position and image viewing at the second viewing position, individually.

Other Embodiment

In embodiments 1 and 2 described above, an exemplary case where LEDs are used as light sources has been described. However, the embodiments are not limited thereto, and another light source may be used.

Moreover, in embodiments 1 and 2, the display panel has been described as a display screen used in the stereoscopic image display device 100 or the stereoscopic image display device 1000. However, the display panel is not limited to a specific system. As long as transmission of light coming from the rear side of the display panel 6 can be controlled, any transmission-control-type display panel of any system may be employed.

Moreover, in embodiments 1 and 2, an exemplary case where the controller 7 is used as a functional unit has been described. However, the embodiments are not limited thereto. The controller 7 may be realized as a software program executable on an arithmetic operation unit such as a CPU, DSP, and the like. Still alternatively, the controller 7 may be realized by a hardware device such as an integrated circuit such as an IC, FPGA, or the like.

According to the present invention, it is possible to obtain a stereoscopic image display device that can adjust an area where a stereoscopic image can be viewed. Further, it is possible to obtain a stereoscopic image display device that allows viewing a stereoscopic image by use of glasses and a two-dimensional image in a wide area.

What is claimed is:

1. A luminous intensity distribution system having a light-incident surface and a light-emitting surface, and in which, given that with respect to the light-emitting surface the system end through which light is emitted is taken to be frontward, the light-incident surface is arranged rearward of the light-emitting surface when viewed from the frontward end, the luminous intensity distribution system comprising:
 a first optical element extending in a first direction, and distributing, given that the first direction is taken to be leftward-rightward when viewed frontward-rearward, light having entered the light-incident surface from a right-rear direction and emitting the light through the light-emitting surface toward a right-forward direction when viewed from the frontward end, and distributing light having entered the light-incident surface through a left-rear direction and emitting the light through the light-emitting surface toward a left-forward direction when viewed from the frontward end; and
 a second optical element extending in the first direction and diffusing light having entered the light-incident surface and emitting the light through the light-emitting surface, wherein
 the first optical element and the second optical element are arranged in parallel with each other vertically when viewed frontward-rearward.

2. The luminous intensity distribution system according to claim 1, wherein
 the first optical element is a prism array including:
 a plurality of triangular projections arranged in a line, each having a vertex angle along the light-incident surface side; and
 a plurality of cylindrical lenses arranged in a line, each forming a bulging shape along the light-emitting surface side, and
 the second optical element is a light diffuser.

3. The luminous intensity distribution system according to claim 1, comprising:
 a plurality of the first optical elements and a plurality of the second optical elements arranged such that each of the plurality of the first optical elements alternate vertically with each of the plurality of the second optical elements, wherein
 the vertical dimension of the second optical element is greater than the vertical dimension of the first optical element.

4. A stereoscopic image display device configured to display a stereoscopic image, comprising:
 a right light source configured to supply display light for displaying a right eye image for a stereoscopic image;
 a left light source configured to supply display light for displaying a left eye image of the stereoscopic image;
 a luminous intensity distribution system having, given that a front side of the stereoscopic image display device is taken to be frontward, a light-incident surface and a light-emitting surface whose light-emitting side corresponds to the frontward end, the light-incident surface being arranged rearward of the light-emitting surface, the luminous intensity distribution system including
 a first optical element extending leftward-rightward, and configured
 to distribute, when viewed from the frontward end, light that has been emitted by the right light source and that has entered the light-incident surface from a right-rear direction, from the light-emitting surface into a right-forward direction and
 to distribute, when viewed from the frontward end, light that has been emitted by the left light source and that has entered the light-incident surface from a left-rear direction, from the light-emitting surface into a left-forward direction,
 such that image light of the right eye image and image light of the left eye image construct an image in a first viewing position, and
 a second optical element extending leftward-rightward, and configured
 to diffuse light that has been emitted by the right light source and that has entered the light-incident surface and light that has been emitted by the left light source and that has entered the light-incident surface so as to be emitted from the light-emitting surface, such that image light of the right eye image and image light of the left eye image are distributed,
 the first optical element and the second optical element being vertically arranged with each other; and
 a display panel configured to control transmission of light from the luminous intensity distribution system, based on the right eye image and the left eye image of the stereoscopic image.

5. The stereoscopic image display device according to claim 4, wherein
 the luminous intensity distribution system includes:
 a prism array, as the first optical element, including
 a plurality of triangular projections arranged in a line, each having a vertex angle along a light-incident surface side of the prism array, and
 a plurality of cylindrical lenses arranged in a line, each forming a bulging shape along a light-emitting surface side of the prism array, and each having a first focal distance and constructing an image in the first viewing position; and
 a light diffuser, as the second optical element, configured to diffuse light having entered the light-incident surface and emitting the light through the light-emitting surface.

6. The stereoscopic image display device according to claim 5, wherein
 the right light source includes a first right eye light source used for viewing at a first viewing position and a second right eye light source used for viewing at a second viewing position which is a position other than the first viewing position,
 the left light source includes a first left eye light source used for viewing at the first viewing position, and a second left eye light source used for viewing at the second viewing position which is a position other than the first viewing position, light supplied by the first right eye light source and light supplied by the first left eye light source enter the prism array, and light supplied by the second right eye light source and light supplied by the second left eye light source enter the light diffuser.

7. The stereoscopic image display device according to claim 6, further comprising:

a controller configured to illuminate the first right eye light source in time-wise alternation with the first left eye light source when a viewer views a stereoscopic image in the first viewing position, and illuminate the second right eye light source simultaneously with the second left eye light source when a viewer views a stereoscopic image at the second viewing position.

8. The stereoscopic image display device according to claim 7, wherein the controller simultaneously illuminates the second right eye light source and the second left eye light source when displaying a two-dimensional image.

9. The stereoscopic image display device according to claim 4, comprising:

a plurality of the prism arrays and a plurality of the light diffusers, each of the plurality of the prism arrays being arranged in vertical alternation with each of the plurality of the light diffusers, wherein the vertical dimension of the light diffuser is greater than the vertical dimension of the prism array.

10. A luminous intensity distribution system having a light-incident surface and a light-emitting surface, and in which, given that with respect to the light-emitting surface the system end through which light is emitted is taken to be frontward, the light-incident surface is arranged rearward of the light-emitting surface when viewed from the frontward end, the luminous intensity distribution system comprising:

a plurality of types of optical elements with different respective construct-image positions, each of the plurality of types of optical elements extending in a first direction, and distributing, given that the first direction is taken to be leftward-rightward when viewed frontward-rearward, light having entered the light-incident surface from a right-rear direction and emitting the light through the light-emitting surface toward a right-forward direction when viewed from the frontward end, and distributing light having entered the light-incident surface from a left-rear direction and emitting the light through the light-emitting surface toward a left-forward direction when viewed from the frontward end, the plurality of types of optical elements being arranged in parallel with each other vertically when viewed frontward-rearward.

11. The luminous intensity distribution system according to claim 10, wherein each of the optical elements is a prism array including:

a plurality of triangular projections arranged in a line, each having a vertex angle along the light-incident surface side; and a plurality of cylindrical lenses arranged in a line, each forming a bulging shape along the light-emitting surface side.

12. The luminous intensity distribution system according to claim 10, comprising:

a plurality of optical elements in two types differing from each other in construct-image position, being arranged in vertical alternation with each other.

13. A stereoscopic image display device configured to display a stereoscopic image, comprising:

a right light source configured to supply display light for displaying a right eye image for a stereoscopic image;

a left light source configured to supply display light for displaying a left eye image of the stereoscopic image;

a luminous intensity distribution system having, given that a front side of the stereoscopic image display device is taken to be frontward, a light-incident surface and a light-emitting surface whose light-emitting side corresponds to the frontward end, the light-incident surface being arranged rearward of the light-emitting surface, the luminous intensity distribution system including:

a plurality of types of optical elements with different respective construct-image positions, each of the plurality of types of optical element extending leftward-rightward and configured to distribute, when viewed from the frontward end, light that has been emitted by the right light source and that has entered the light-incident surface from a right-rear direction, from the light-emitting surface into a right-forward direction and to distribute, when viewed from the frontward end, light that has been emitted by the left light source and that has entered the light-incident surface from a left-rear direction, from the light-emitting surface into a left-forward direction, such that image light of the right eye image and image light of the left eye image construct an image in a plurality of viewing positions, the plurality of types of optical elements being vertically arranged with each other; and a display panel configured to control transmission of light from the luminous intensity distribution system, based on the right eye image and the left eye image of the stereoscopic image.

14. The stereoscopic image display device according to claim 13, wherein the luminous intensity distribution system includes, as the plurality of optical elements, a first prism array including a plurality of triangular projections arranged in a line, each having a vertex angle along a light-incident surface of the first prism array, and a plurality of first cylindrical lenses arranged in a line, each forming a bulging shape along a light-emitting surface of the first prism array, and each having a first focal distance and constructing an image in a first viewing position, and a second prism array including a plurality of triangular projections arranged in a line, each having a vertex angle along the light-incident surface of the second prism array, and a plurality of second cylindrical lenses arranged in a line, each forming a bulging shape along the light-emitting surface of the second prism array, and each having a second focal distance and constructing an image in a second viewing position; and the second focal distance is shorter than the first focal distance.

15. The stereoscopic image display device according to claim 14, wherein the first focal distance is a distance from each first cylindrical lens to the vertex of a corresponding one of the triangular projections, and the second focal distance is a distance from each second cylindrical lens to the vertex of a corresponding one of the triangular projections.

16. The stereoscopic image display device according to claim 14, wherein
- the right light source includes a first right eye light source used for viewing at a first viewing position and a second right eye light source used for viewing at a second viewing position,
- the left light source includes a first left eye light source used for viewing at the first viewing position and a second left eye light source used for viewing at the second viewing position,
- light supplied by the first right eye light source and light supplied by the first left eye light source enter the first prism array, and
- light supplied by the second right eye light source and light supplied by the second left eye light source enter the second prism array.

17. The stereoscopic image display device according to claim 16, comprising:
- a controller configured to
- illuminate the first right eye light source and the first left eye light source when a viewer views a stereoscopic image in the first viewing position, and
- illuminate the second right eye light source and the second left eye light source when a viewer views a stereoscopic image in the second viewing position.

18. The stereoscopic image display device according to claim 14, comprising:
- a plurality of the first prism arrays and a plurality of the second prism arrays arranged such that each of the plurality of the first prism arrays alternates vertically with each of the plurality of the second prism arrays.

* * * * *